(12) United States Patent
Wright (10) Patent No.: US 8,094,794 B2
(45) Date of Patent: Jan. 10, 2012

(54) ADVERTISING MESSAGE REFERRALS

(75) Inventor: Steven Allan Wright, Roswell, GA (US)

(73) Assignee: AT&T Intellectual Property I. L.P., Atlanta, GA (US)

( * ) Notice: Subject to any disclaimer, the term of this patent is extended or adjusted under 35 U.S.C. 154(b) by 1165 days.

(21) Appl. No.: 11/535,788

(22) Filed: Sep. 27, 2006

(65) Prior Publication Data

US 2008/0195466 A1   Aug. 14, 2008

(51) Int. Cl.
*H04M 15/00* (2006.01)

(52) U.S. Cl. ......... 379/114.13; 379/114.12; 379/121.02; 705/14.5

(58) Field of Classification Search .................... 379/72, 379/91.01, 114.1, 114.12, 114.13, 114.19, 379/121.02; 345/87; 1/1; 705/14.5, 14.66
See application file for complete search history.

(56) References Cited

U.S. PATENT DOCUMENTS

| | | | |
|---|---|---|---|
| 7,057,591 B1 * | 6/2006 | Hautanen et al. | 345/87 |
| 7,113,571 B2 * | 9/2006 | Matsubara et al. | 379/72 |
| 2006/0041478 A1 * | 2/2006 | Zheng | 705/14 |
| 2006/0277105 A1 * | 12/2006 | Harris | 705/14 |
| 2007/0124287 A1 * | 5/2007 | Gorodyansky | 1/1 |

* cited by examiner

*Primary Examiner* — Md S Elahee
(74) *Attorney, Agent, or Firm* — Hope Baldauff Hartman, LLC (57) ABSTRACT

Advertising referral methods and systems allow a first user to refer advertisements of interest to other users, taking advantage of pre-existing social networks. A referral server may coordinate a referral by either receiving a referral message from the first user for forwarding to another user, or by receiving notification of the referral message. Information about the referral may be stored in a database. If another user accesses the referred advertisement, additional information may be received by the referral server and stored in the database. The first user may be credited with inducements based on the referred advertisement and whether or not another user accessed it.

20 Claims, 6 Drawing Sheets

ADVERTISING MESSAGE REFERRALS

FIELD OF THE INVENTION

The present invention relates to referring advertisements. More particularly, advertisements are forwarded by one consumer to another.

BACKGROUND

In today's information age, the concept of broadcast marketing via television and other mass media is being supplanted to some extent by newer forms of marketing. Perhaps most notable among these new advertising methods is the concept of viral marketing, which seeks to exploit existing social networks among individuals. If one individual receives an advertising message or advertisement that she feels is particularly clever or funny, or would be of interest to a friend, she may tell one or more members of her social network where to find it. At that point, the advertisement has gone "viral" and may be passed on to other individuals in an ever-expanding extended social network. Such marketing methods may be enabled in part by today's Internet, as well as by other public and proprietary electronic networks.

Ads broadcast using current technologies do not easily lend themselves to being virally marketed. If a viewer watching a television program sees an advertisement which he feels may be useful to a friend (e.g., car commercial for a friend who is car shopping), he can tell the friend directly about the advertisement, but the full impact of the ad's message may be lost. The viewer may be able to record the advertisement with a digital video recorder (DVR), computer, or even with a video or audio cassette recorder, but forwarding the recording may prove cumbersome. More than likely, the chance to forward the advertisement to the person who could have benefited will likely be lost. This may especially be true in a situation where the original viewer is not motivated to forward the advertisement other than the desire to help or amuse a friend.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Exemplary methods according to embodiments of the invention are for referring an advertisement from a first user to at least a second user. A first notification is received that an advertisement is to be forwarded to the second user. Information associated with the referral is stored, and may include identifiers of the advertisement, the users, and possible inducements credited to the first user. If the second user accesses the advertisement, then a second notification may be received, and information associated with the second notification is stored.

Exemplary systems are for referring an advertisement from a first user device to at least a second user device. An advertising serving device is capable of serving the advertisement to the first user device. A database serving device is capable of storing information associated with the referral, and a referral serving device is capable of receiving notification of the referral from the first user device, storing information associated with the referral in the database serving device, and if the second user device accesses the advertisement, receiving and storing information associated with the access.

According to other exemplary embodiments, methods are for referring an advertisement to a remote user. The advertisement is received via a packet-based network. A referring user inputs an instruction to refer the advertisement to the remote user and selects the remote user. A message including a reference to the advertisement is forwarded to the remote user.

Other apparatuses, systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

The following detailed description is directed to methods and systems for referring advertisements between users. In the following detailed description, references are made to the accompanying drawings that form a part hereof, and which are shown, by way of illustration, using specific embodiments or examples. Referring now to the drawings, in which like numerals represent like elements through the several figures, aspects of the methods and systems provided herein will be described.

Figure 1:
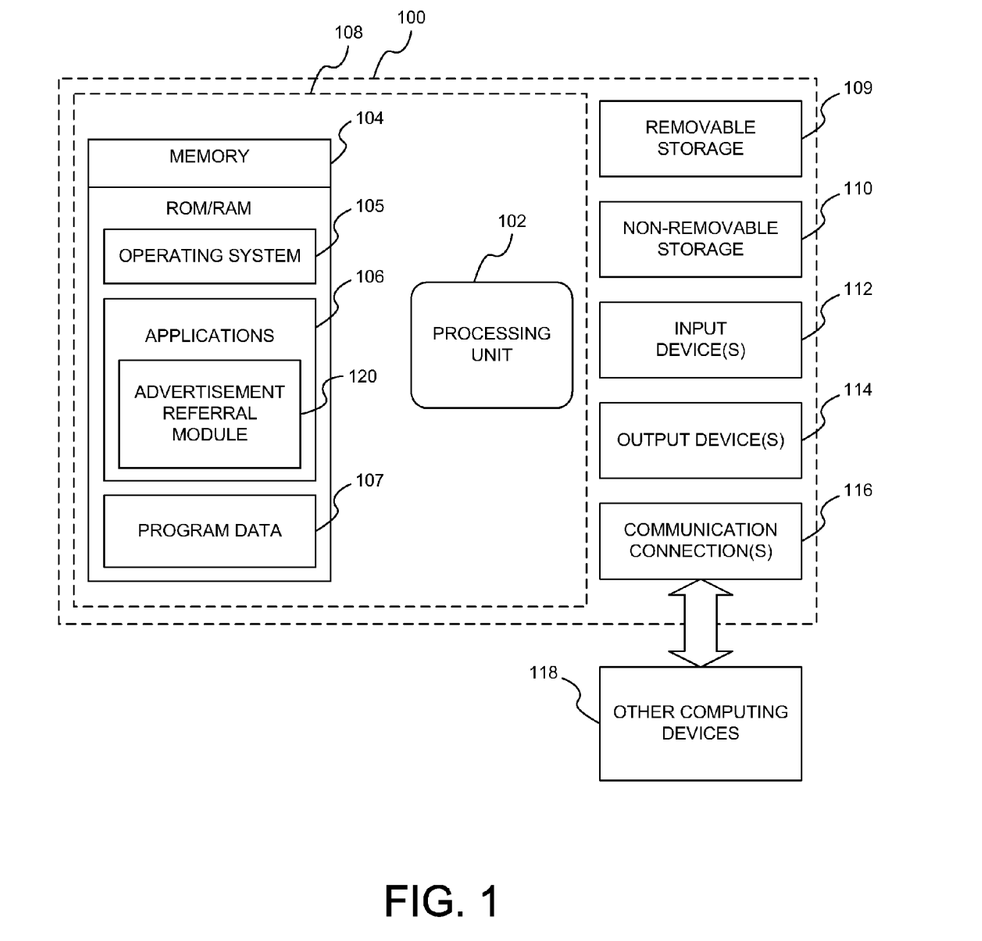
FIG. 1 is a block diagram illustrating an example of a suitable computing environment in which advertisement referral module may execute.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, embodiments of the invention may include a computing device, such as computing device 100. In a basic configuration shown in FIG. 1, computing device 100 includes at least one processing unit 102 and memory 104. Depending on the configuration of the computing device 100, memory 104 may be volatile (e.g., Random Access Memory (RAM)), non-volatile (e.g., Read-Only Memory (ROM), Flash, etc.), or some combination thereof. Memory 104 serves as a storage location for operating system 105, one or more applications 106, and may include program data 107, as well as other programs. In one embodiment, applications 106 includes an advertisement referral module 120, an application including similar logic, or any other set of instructions comprising such logic. It should be noted that the logic of advertisement referral module 120 may be distributed and/or shared across multiple computing devices.

Computing device 100 may include additional features and functionality other than the features shown within dashed-line box 108. For example, computing device 100 may include additional data storage components, including both removable storage 109 (e.g., floppy disks, memory cards, compact disc (CD) ROMs, digital video discs (DVDs), external hard drives, universal serial bus (USB) key drives, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, and magnetic disks. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, for example, a keyboard, mouse, digitizing pen, microphone, touchpad, touch-display, or any combination thereof. Output devices 114 may include, for example, displays, speakers, and printers. Additional forms of storage, input, and output devices may be utilized.

Computing device 100 may also include one or more communication connections 116 which allow the computing device 100 to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit (or some combination thereof) with other computing devices 118.

Figure 2:
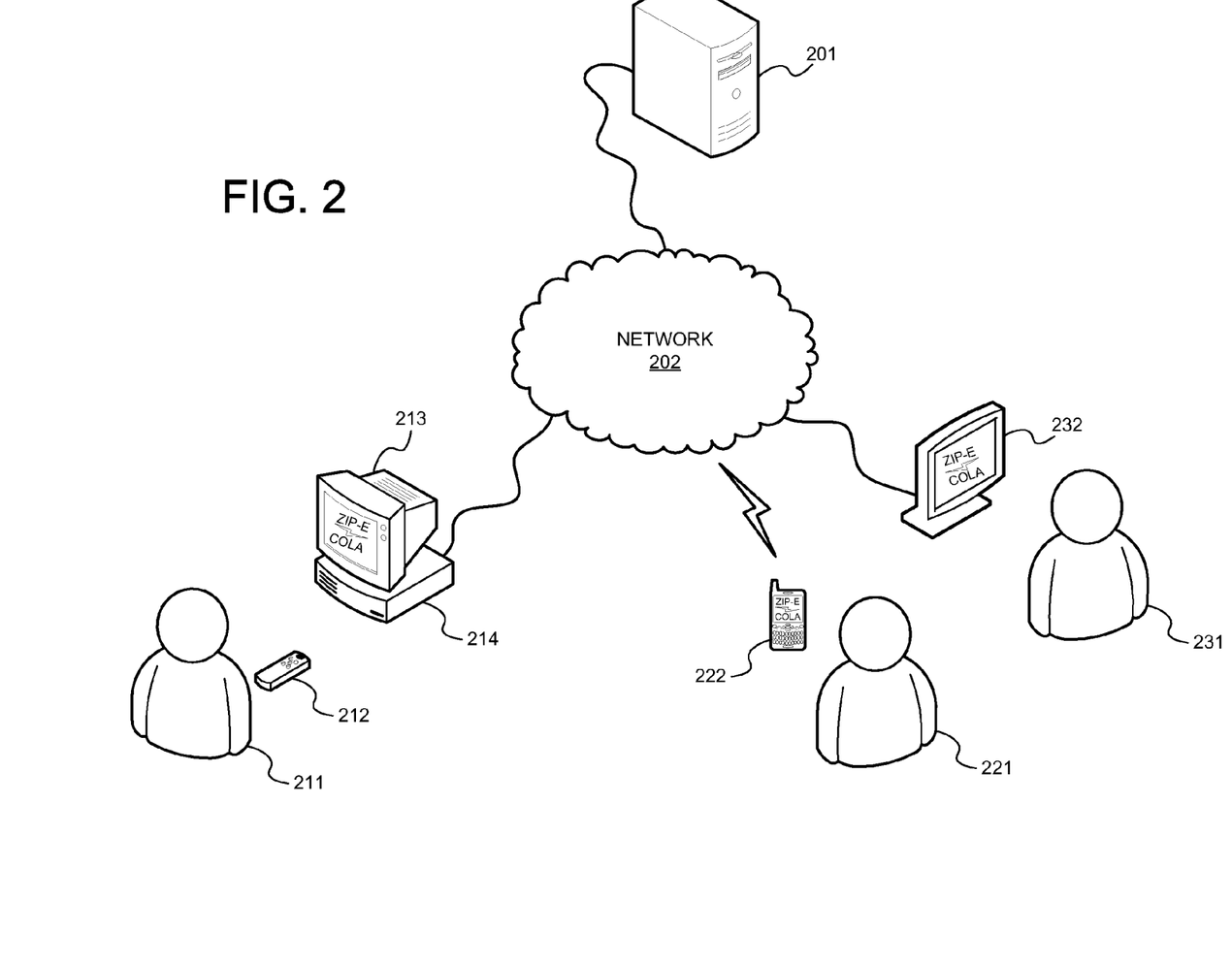
FIG. 2 depicts an example of a system incorporating advertisement referral module.

Turning now to FIG. 2, depicted is an example of a system incorporating advertisement referral module 120, including several examples of embodiments of computing device 100. Viewer 211 is watching his television 213, which receives content via set top box 214. Set top box 214 may be an embodiment of computing device 100, including advertisement referral module 120. Viewer 211 controls content using remote 212. Content is received by set top box 214 via network 202, and may be delivered to set top box 214 using a packet-based protocol such as Internet Protocol Television (IPTV). Content may additionally or alternatively be delivered via cable television, satellite, high-speed Internet, WiFi or WiMax wireless networks, and other content-delivery mediums. Regardless of delivery protocol or medium, advertisement referral module 120 executing on set top box 214 may distinguish between programs and advertisements being displayed on television 213. Information accompanying advertisements may include an advertisement ID which can identify the information as an advertisement and uniquely identify the particular advertisement being displayed.

Viewer 211, interacting with set top box 214 via remote 212, may refer or forward an advertisement to one or more recipients 221, 231. Viewer 211 may depress a button on remote 212, causing set top box 214 to save information about the currently displayed advertisement. Set top box 214 may store the advertisement itself, or store an advertisement ID. Viewer 211 may either immediately, or at some later point, indicate his desire to forward or refer the advertisement to recipients 221, 231. Viewer 211 may indicate his desire by pressing a button on remote 212, touching the screen of television 213, speaking a voice command, or otherwise indicating his desire to refer the advertisement. In response to receiving an indication to forward the advertisement, advertisement referral module 120 may present viewer 211 with options for referring the advertisement. Options may include, but are not limited to, selecting recipients from an address book, entering contact information for a new recipient, and adding an accompanying text, voice, or video message. Options may be input utilizing remote 212, or any other input device, including, for example, a keyboard, a microphone, a camera, and so forth.

It should be noted that although viewer 211 is interacting with a network-connected set top box 214 attached to a television 213 using remote 212, other computing devices 100 and configurations may be utilized for accessing and referring advertisements. Computing devices 100 may include a personal computer, a personal data assistant (PDA), a portable video or audio player, and any other similarly capable device. Devices do not need to be directly connected to network 202, such as in the case of a portable video player. Instead, these devices must be capable of connecting at some future time to network 202, either directly or through another connected device. In this fashion, referring devices that are disconnected when an advertisement referral is made can later connect and forward any referred advertisements.

Computing device 100 may forward referred advertisements directly to devices associated with recipients 221 and 231, either as an attachment to a message, or as a forwarded reference (e.g., uniform resource locator (URL)) pointing to the advertisement content somewhere on network 202. Network 202 may include one or more open or closed networks, including the Internet or an IPTV network provided by a service provider, such as a cable or telephone company. Network 202 may also include one or more wireless communications networks such as, but not limited to, a cellular network, an IEEE 802.11 network, and a Bluetooth® network. Network 202 may further include one or more wireline communications networks including, such as a telecommunications network, an Ethernet network, or a cable television network. Network 202 may include server 201, represented here by a single machine, but which may be comprised of multiple server machines. Server 201 may stream IPTV content to viewer 211. Network 202 may also include additional transmission, reception, and/or concentration points, including satellite receivers, modulators, routers, concentrators, multiplexers, and gateways. Network 202 may include facilities such as a telecommunications central office or a cable head end.

Server 201 may also handle referred advertisements, either receiving and forwarding messages including referrals, or merely receiving information about referred advertisements. When recipients 221, 231 receive a referred advertisement and access the advertisement by opening or playing it, server 201 may receive information about the access. Recipients 221, 231 may receive a notification that an advertisement has been referred by viewer 211. Notification may come in the form of an email message, an instant message, a short message service (SMS) message, a multimedia message service (MMS) message, or any other messaging service or system. For recipient 221 using wireless device 222, an email message or SMS message may include a URL providing a link to a location where the advertisement content may be stored on network 202. Recipient 231 using display 232 may receive some form of on-screen notification, such as might be provided by an instant message. Recipient 231 may receive the advertisement content as an attachment to the message, an attachment which can be opened and accessed.

To encourage forwarding or referring of advertisements, viewer 211 may receive inducements to refer. Inducements may include, but are not limited to, discounts on IPTV service, discounts on products or services from the advertiser, loyalty program points for later redemption (e.g., frequent flyer miles), and other items of value. Server 201 may track information about referred advertisements and the viewers that forward them. Such tracking information may be stored and utilized to tally inducements for a viewer. Tracking information may also be available for use by advertisers and system providers for customer analysis and for the enhancement of future advertisement, products, and services. Such information may first be anonymized and/or aggregated to prevent private viewer information from being inappropriately shared with advertisers (unless a viewer has perhaps requested that the information be shared).

Figure 3:
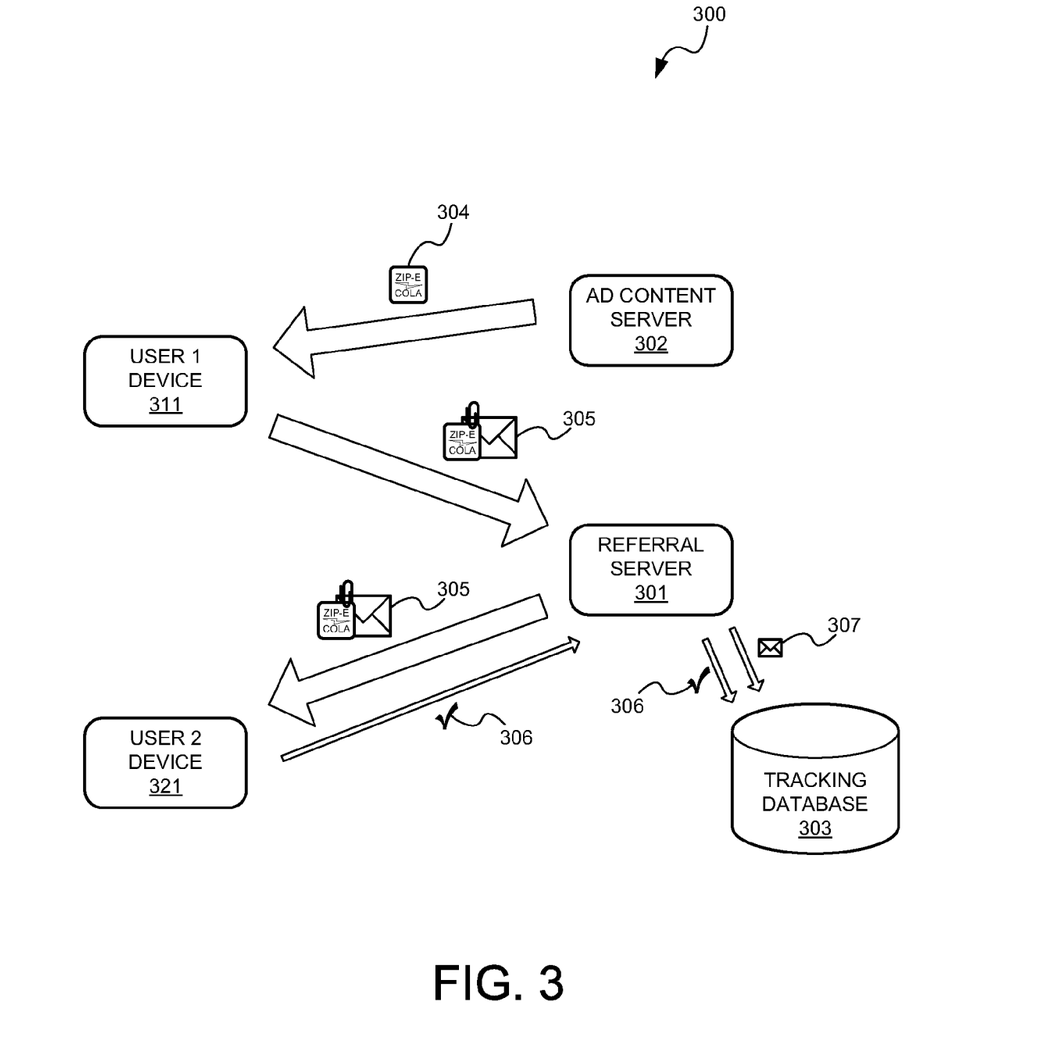
FIGS. 3 through 5 depict examples of processes for referring an advertisement from a first user device to a second user device.

Turning now to FIG. 3, a process 300 for referring advertisements will now be described. Although shown as distinct functional blocks, advertisement content server 302, referral server 301, and tracking database 303 may reside on a single server machine, or components of each may reside on disparate server machines. Initially here, advertisement content server 302 serves an advertisement 304 to user 1 device 311. Advertisement 304 may include a video commercial shown during the course of an IPTV program. Likewise, advertisement 304 may include an interstitial advertisement shown while a first user of device 311 fast forwards through a program, for example. Advertisement 304 may also include an audio advertisement played during an audio program on a digital audio device such as an MP3 player. Advertisement content server 302 may serve additional advertisement formats.

When the first user decides that an advertisement is worthy of referring to one or more friends, the user may so indicate and select a second user of user 2 device 321 to receive the referred advertisement. Device 311 may create a message 305, for example an email, and attach advertisement 304 to the message. Message 305 may be forwarded to referral server 301 for tracking and forwarding. Upon receiving message 305, referral server 301 may validate the message and store tracking information 307 in database 303. Validation may include ensuring that the second user of user 2 device 321 has not opted out of receiving referred advertisements, either from the first user or from the associated advertiser. Validation may further include ensuring that the first user has not "spammed" the second user with too many advertisement referrals, either to harass the second user or to improperly inflate inducements. Tracking information 307 may include identifiers of the advertisement, and of the first and second users. User identifiers may include a unique identifier such as an account number or an email address. Tracking information 307 may also include date and time, originating program, as well as a record of any inducements to be provided to either user as a result of the referral.

Referral server 301 may forward message 305, including advertisement 304, to user 2 device 321. The second user may, upon receiving message 305, delete or open the message and/or play or otherwise access the attached advertisement 304. If the second user decides to access advertisement 304, confirmation information 306 may be sent back to referral server 301 in order to track the effectiveness of the referral. Confirmation information 306 stored in database 303 may again include identifiers of the advertisement 304 and of the first and second users. Confirmation information 306 may also include any additional inducements received by either user as a result of the second user opening or playing advertisement 304. Optionally, the second user may decide to refer the advertisement 304 to a third user, at which point, a similar process begins again, including forwarding the advertisement 304 and tracking information about the advertisement 304.

Figure 4:
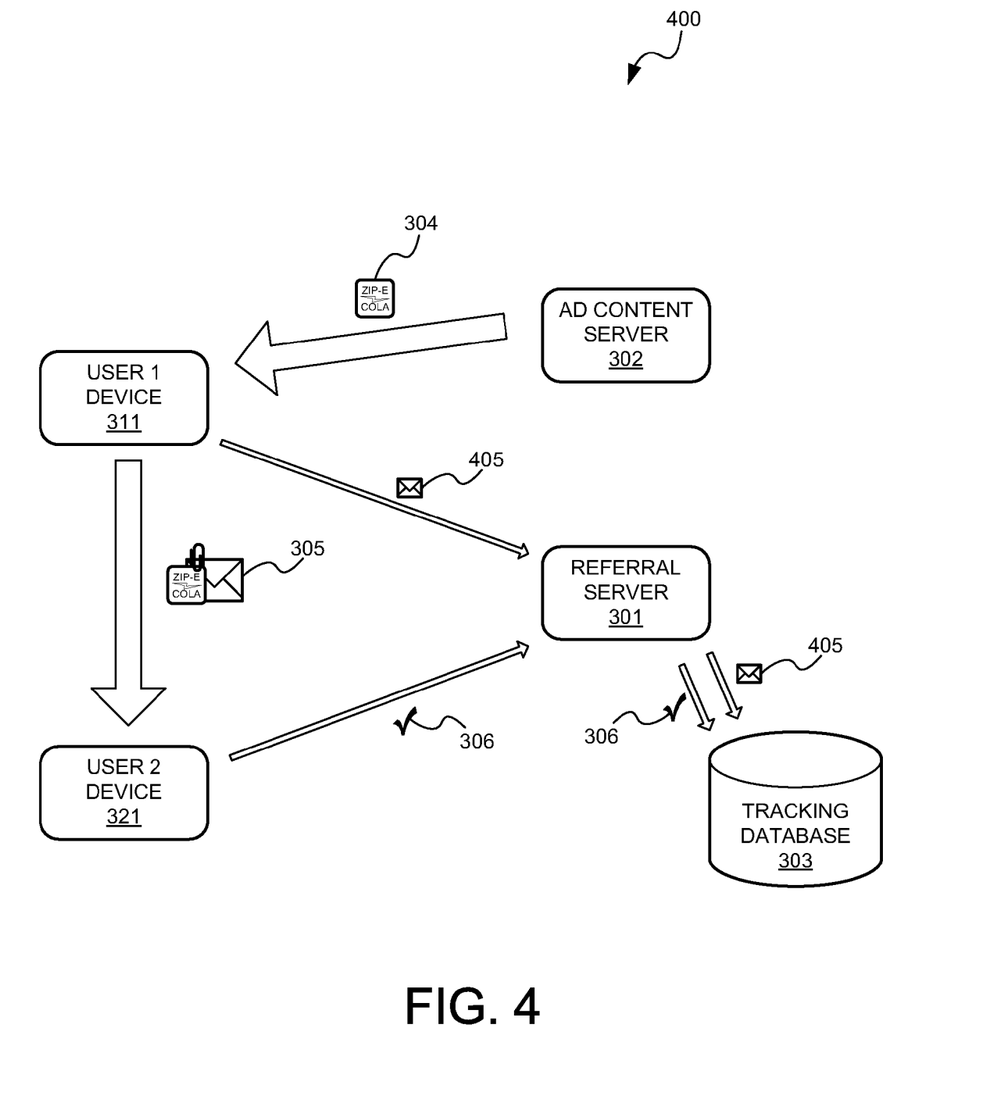

FIG. 4 depicts an additional embodiment of a process 400 for referring an advertisement. Here, advertisement content server 302 forwards advertisement 304 for use on user 1 device 311. When the first user opts to refer advertisement 304, message 305 is again generated and advertisement 304 is attached. Message 305, however, is directly transmitted to user 2 device 321. Referral information 405 may be sent to referral server 301 for eventual storage in tracking database 303. Referral server 301 may also use referral information 405 to validate the referral as discussed above prior to allowing device 311 to send message 305. Again, if the second user accesses advertisement 304, confirmation information 306 is sent to referral server 301 for storage in tracking database 303. Process 400 may be used as an alternative to process 300 in a situation where a connection between device 311 and device 321 is of a higher bandwidth than connections to referral server 301. This may be the situation if both devices reside in the same local area network (LAN) or wide area network (WAN). Device 311 and/or referral server 301 may make a determination as to which process (e.g., process 300 or 400) to use on a case-by-case basis. For example, device 311 may perform bandwidth testing for each recipient prior to forwarding a message.

Figure 5:
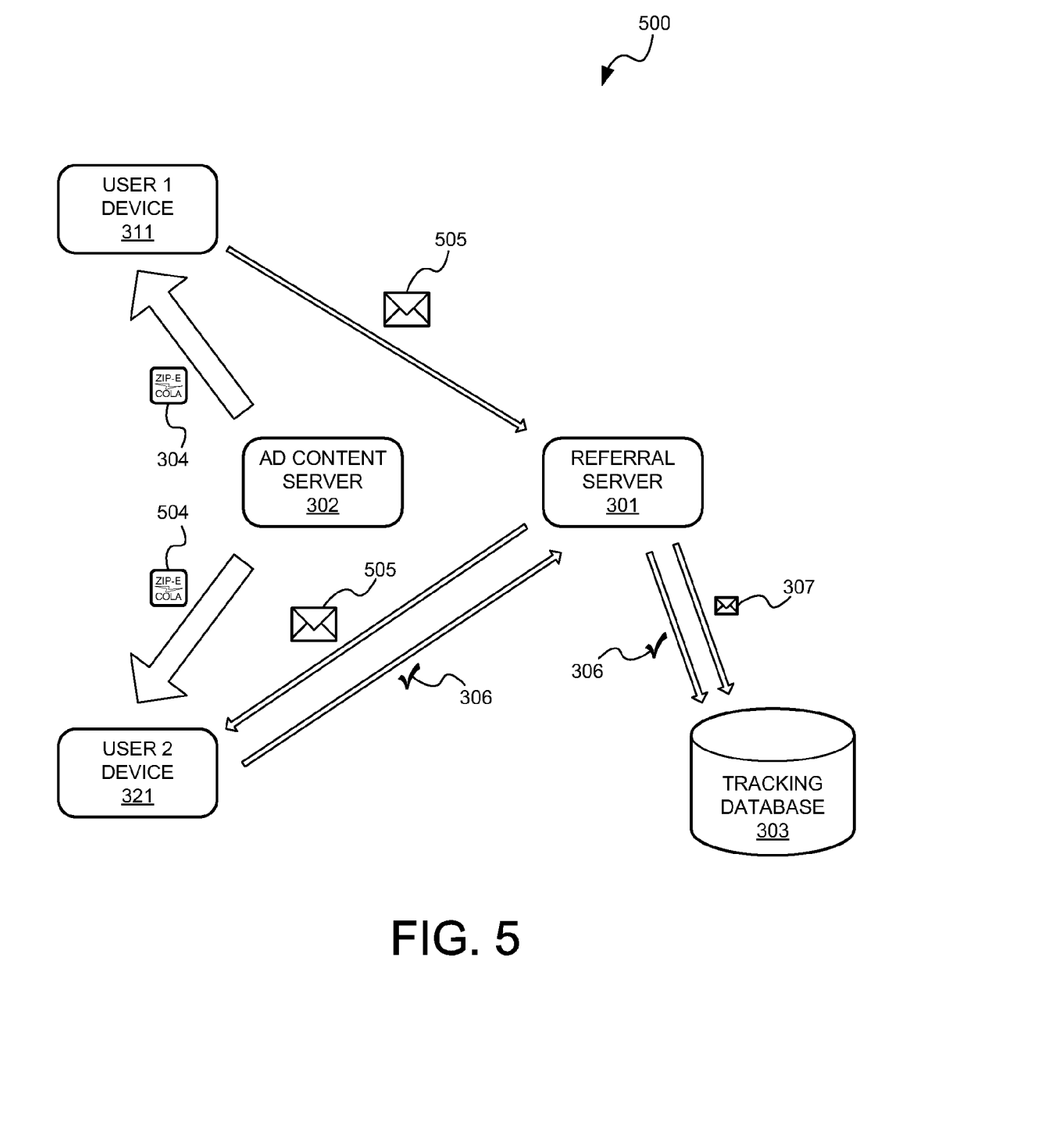

FIG. 5 depicts another embodiment of a process 500 for referring an advertisement. Advertisement content server 302 forwards advertisement 304 for use on user 1 device 311. When device 311 receives input to forward the advertisement to user 2 device 321, message 505 is sent to referral server 301. Message 505 does not include the attached advertisement 304 as before. Rather, message 505 may include a URL pointing to the advertisement 304 on advertisement content server 302. As above, referral server 301 may validate the referral and store tracking information 307 about the referral. Referral server 301 forwards message 505 to device 321. If the user of device 321 decides to access the advertisement 304, the user may click on a link in message 505, or otherwise indicate his or her assent. Advertisement content server 302 may then serve a version of advertisement 304 to device 321. In a situation where device 321 uses different hardware, software, or has a different resolution or bandwidth than device 311, advertisement content server 302 may detect these settings and send a different version of an advertisement, such as content 504. For example, if device 311 is a set top box attached to a High Definition (HD) television with a high bandwidth network connection, content 304 may comprise a high-resolution video with stereo sound. If device 321 is a wireless device (e.g., a PDA), then content 504 may be the same advertisement, but down-sized to fit on a smaller resolution display and be transmitted over a slower wireless connection with mono audio. If device 321 is merely an audio player, advertisement content server 302 may send an audio-only version of advertisement 304. As advertisement 304 "goes viral" and is forwarded among multiple user devices, different delivery methods may be selected, and different versions of advertisement 304 may be selected depending on device and bandwidth considerations.

Figure 6:
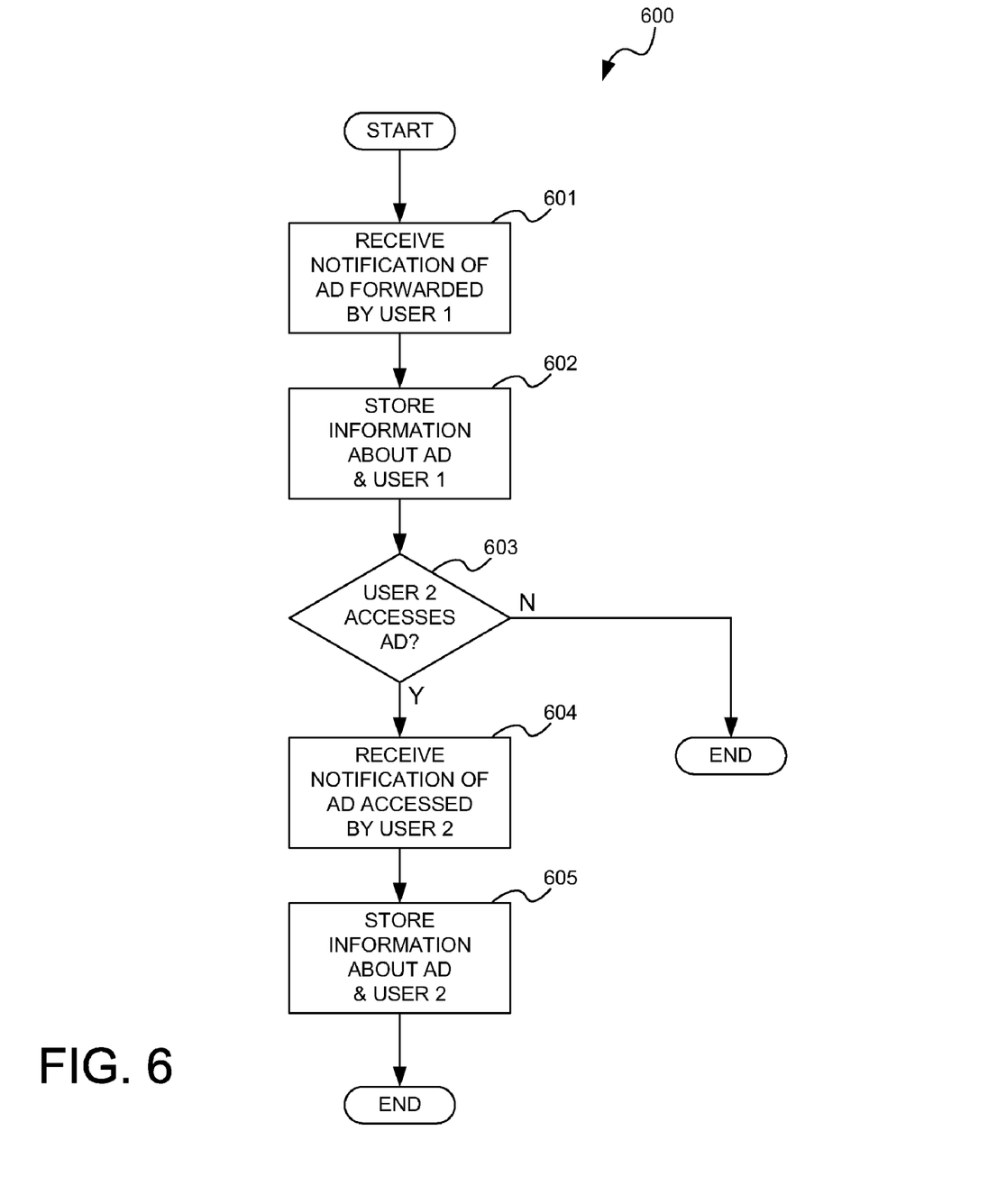
FIG. 6 is a flow chart illustrating an example of a process for referring an advertisement from a first user device to a second user device.

FIG. 6 depicts an example of a process 600 for referring an advertisement. Such a process may be implemented on one or more computing devices 100 including the functionality of referral server 301. The logical operations of the various implementations presented, including those of FIG. 6, may be (1) a sequence of computer implemented acts or program modules running on one or more computers 100 and/or (2) interconnected machine logic circuits or circuit modules within computing device 100. The implementation is a matter of choice dependent on the performance requirements of the computer on which the embodiments are implemented. Accordingly, the functional operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

At operation 601, a notification is received that an advertisement is being referred by user 1 to user 2. This notification may include an actual message for referral, with or without the attached advertisement, or it may include just essential information about the referral. The notification may be processed and possibly validated. If validated, information about the referral is stored at operation 602. Stored information may include identifiers of the advertisement, user 1, user 2, date and time, originating program, and inducements received. If at decision 603, user 2 opens or plays the referred advertisement, then at 604, a notification is received that the advertisement was accessed. At operation 605, additional information may be stored about user 2 accessing the advertisement. This information may include advertisement identifier, user 1, user 2, and additional inducements received.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for referring an advertisement from a first user device to a second user device, the method comprising:
providing the advertisement to the first user device;
after providing the advertisement to the first user device, receiving a first notification from the first user device that the advertisement is to be referred to the second user device;
in response to receiving the first notification, providing an option to the first user device for referring the advertisement, wherein the option comprises adding accompanying information from the first user device to the advertisement;
storing first information associated with the first user device and second information associated with the advertisement;
after receiving the first notification from the first user device, determining whether the second user device authorizes receipt of advertisements referred from the first user device and from an advertiser associated with the advertisement;
upon determining that the second user device authorizes receipt of the advertisements referred from the first user device and from the advertiser associated with the advertisement, transmitting the advertisement and the accompanying information to the second user device; and
if the second user device accesses the advertisement, then:
receiving a second notification from the second user device that the advertisement was accessed, and
storing third information associated with the second user device and fourth information associated with the advertisement; and forwarding the advertisement and tracking information of the advertisement to a server for referring the advertisement to a third user.

2. The method of claim 1, further comprising:
receiving a message from the first user device for forwarding to the second user device, wherein the message includes a reference to the advertisement; and
forwarding the message to the second user device.

3. The method of claim 2, wherein receiving the message comprises receiving the message that includes a reference to an attached version of the advertisement.

4. The method of claim 2, wherein receiving the message comprises receiving the message that includes a reference to a remotely-stored version of the advertisement.

5. The method of claim 1, wherein storing the first information associated with the first user device and the second information associated with the advertisement comprises:
storing a first identifier of the advertisement; and
storing a second identifier of a first user of the first user device.

6. The method of claim 5, wherein storing the first information associated with the first user device and the second information associated with the advertisement further comprises storing fifth information about an inducement credited to the first user.

7. The method of claim 1, wherein storing the third information associated with the second user device and the fourth information associated with the advertisement comprises:
storing a first identifier of the advertisement; and
storing a second identifier of a second user of the second user device.

8. The method of claim 7, wherein storing the third information associated with the second user device and the fourth information associated with the advertisement further comprises storing fifth information about an additional inducement credited to the first user.

9. The method of claim 1, wherein the first notification comprises a voice command from a first user of the first user device.

10. A system for referring an advertisement from a first user device to a second user device, the system comprising:
   memory for storing a program containing code for referring the advertisement from the first user device to the second user device; and
   a processor functionally coupled to the memory, the processor being responsive to computer-executable instructions contained in the program and configured at least to:
      provide the advertisement to the first user device,
      after providing the advertisement to the first user device, receive a first notification that the first user device is referring the advertisement to the second user device,
      in response to receiving the first notification, provide an option to the first user device for referring the advertisement, wherein the option comprises adding accompanying information from the first user device to the advertisement,
      store first information associated with the first notification,
      after receiving the first notification from the first user device, determine whether the second user device authorizes receipt of advertisements referred from the first user device and from an advertiser associated with the advertisement;
      upon determining that the second user device authorizes receipt of the advertisements referred from the first user device and from the advertiser associated with the advertisement, transmit the advertisement and the accompanying information to the second user device; and
      if the advertisement is accessed by the second user device, receive a second notification from the second user device that the advertisement was accessed, store second information associated with the second notification, and forward the advertisement and tracking information of the advertisement to a server for referring the advertisement to a third user.

11. The system of claim 10, wherein the processor is further configured to receive a message from the first user device for forwarding to the second user device, wherein the message includes a reference to the advertisement.

12. The system of claim 11, wherein the message comprises a reference to an attached copy of the advertisement.

13. The system of claim 11, wherein the message comprises a reference to a remotely-stored version of the advertisement.

14. The system of claim 13, wherein the processor is further configured to:
   determine a first version of the advertisement to serve to the first user device based on the first user device; and
   determine a second version of the advertisement to serve to the second user device based on the second user device, wherein the second version is different from the first version.

15. The system of claim 10, wherein storing the first information associated with the first notification comprises storing a first identifier of the advertisement and a second identifier of a first user of the first user device.

16. The system of claim 10, wherein the first notification comprises a voice command from a first user of the first user device.

17. A method for referring an advertisement to a remote user, the method comprising:
   receiving the advertisement via a network;
   providing a first version of the advertisement to a first device associated with a referring user, wherein the first version of the advertisement is based on the first device associated with the referring user;
   receiving an instruction from the first device to refer the advertisement;
   in response to receiving the instruction, providing an option to the first device for referring the advertisement, wherein the option comprises adding accompanying information from the referring user to the advertisement;
   receiving a selection from the first device of the remote user to receive the advertisement referred by the referring user;
   determining whether the remote user authorizes receipt of advertisements referred from the referring user and from an advertiser associated with the advertisement;
   upon determining that the remote user authorizes receipt of the advertisements referred from the referring user and from the advertiser associated with the advertisement, forwarding a message for delivery to a second device associated with the remote user, wherein the message includes a reference to the advertisement and the accompanying information;
   receiving an indication that the reference to the advertisement has been selected; and
   in response to receiving the indication, providing a second version of the advertisement to the second device associated with the remote user, wherein the second version of the advertisement is based on the second device associated with the remote user, and forwarding the advertisement and tracking information of the advertisement to a server for referring the advertisement to a third user.

18. The method of claim 17, wherein forwarding the message includes forwarding the advertisement as an attachment to the message.

19. The method of claim 17, wherein forwarding the message includes forwarding a uniform resource locator locating the advertisement.

20. The method of claim 17, wherein forwarding the message includes forwarding the message directly to the remote user, and wherein the method further comprises:
   providing a notification including an identifier of the referring user, an identifier of the remote user, and an identifier of the advertisement.

* * * * *